United States Patent [19]
Stierli

[11] Patent Number: 5,928,344
[45] Date of Patent: Jul. 27, 1999

[54] SERIAL DATA BUS AND USE THEREOF

[75] Inventor: Peter Stierli, Stäafa, Switzerland

[73] Assignee: Cerberus AG, Switzerland

[21] Appl. No.: 08/873,668

[22] Filed: Jun. 12, 1997

[30] Foreign Application Priority Data

Jun. 13, 1996 [EP] European Pat. Off. .............. 96109448

[51] Int. Cl.[6] ................................................... G06F 13/42
[52] U.S. Cl. ........................... 710/105; 710/100; 710/129
[58] Field of Search ................................... 395/280, 284, 395/285, 290, 293, 309

[56] References Cited

U.S. PATENT DOCUMENTS

| | | | |
|---|---|---|---|
| 4,139,737 | 2/1979 | Shimada et al. | 179/15 |
| 4,227,181 | 10/1980 | Brittain | 340/167 |
| 4,293,947 | 10/1981 | Brittain | 370/89 |
| 4,658,243 | 4/1987 | Kimura et al. | 340/505 |
| 4,797,582 | 1/1989 | Nguyen et al. | 307/475 |
| 4,907,222 | 3/1990 | Slavik . | |
| 5,089,974 | 2/1992 | Demeyer et al. | 364/492 |
| 5,347,515 | 9/1994 | Marino . | |

FOREIGN PATENT DOCUMENTS

| | | |
|---|---|---|
| 0134174 | 3/1985 | European Pat. Off. . |
| 0306934 | 3/1989 | European Pat. Off. . |
| 3717886 | 12/1988 | Germany . |

*Primary Examiner*—Ayaz R. Sheikh
*Assistant Examiner*—Jigar Pancholi
*Attorney, Agent, or Firm*—Baker & Botts, L.L.P.

[57] ABSTRACT

A serial data bus with a two-wire line and a plurality of bus nodes for the exchange of data messages in both directions between the bus nodes and a central unit connected to the bus and for the current supply of the bus nodes. Conflicts between data messages that appear simultaneously are resolved on the basis of the priority thereof. The bus is constructed in the manner of a multi-master system in which each bus and the central unit is a master, and the central unit provides the bus timing and controls the synchronization of the bus. Each bit transmission is divided up into a positive and a negative phase, the current supply of the bus nodes being effected in the positive phase and the data transmission being effected in the negative phase.

The bus is preferably used for a hazard-detection system wherein the bus nodes comprise a micro-controller and either are constituted by special detectors with integrated bus or comprise an interface for the connection of the detectors. Bus protocol and bus timing are coordinated with the micro-controllers in such a way that the latter can take over the operation of the bus.

15 Claims, 3 Drawing Sheets

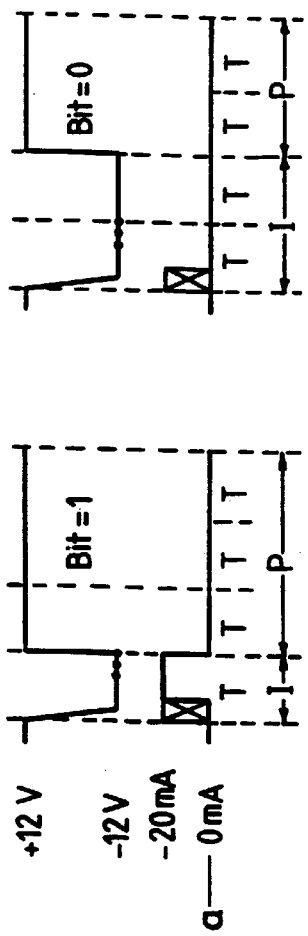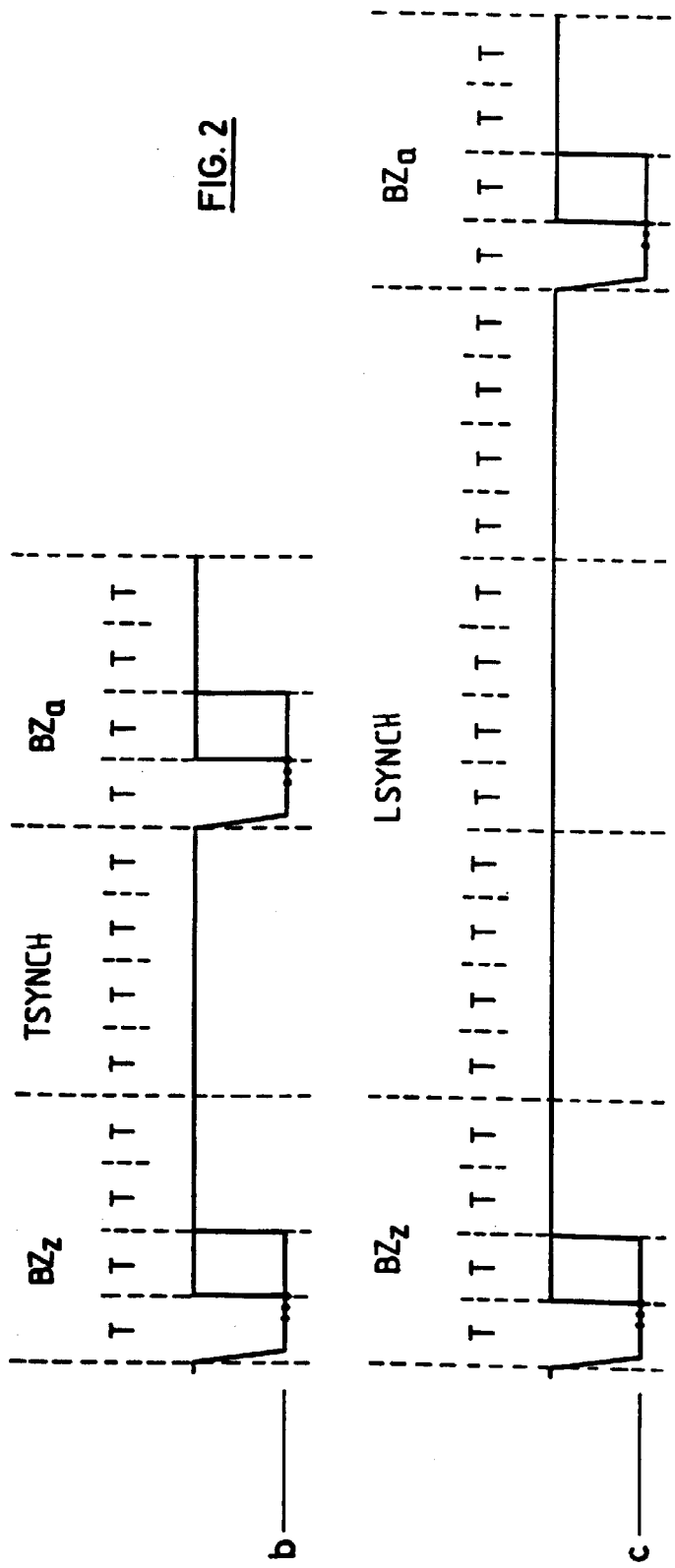
FIG. 2

SERIAL DATA BUS AND USE THEREOF

BACKGROUND OF INVENTION

The present invention relates to a serial data bus with a two-wire line and with a plurality of bus nodes for the exchange of data messages in both directions between the bus nodes and a central unit connected to the serial data bus and for the current supply of the bus nodes, wherein conflicts between data messages that appear simultaneously are resolved on the basis of the priority thereof.

Serial data buses of this type are known in many versions. One of the problems to be solved with such buses consists in guaranteeing a reaction-time to node data that is as short as possible, this being achieved as a rule by a correspondingly high bit rate. However, since each increase in the bit rate results in an increase in the costs of the bus system, this solution cannot generally be adopted. When such a bus is designed with a plurality of nodes, the transport of relatively high currents on the bus may be required in order to be able to connect as many nodes as possible to the central unit. However, it has not hitherto been possible to achieve this requirement satisfactorily, so that until now two-wire buses have only been used in systems with a limited number of nodes or with nodes that consume only very little current.

Therefore, an object of the present invention is to provide a serial data bus that is distinguished by a low bus node cost (and hence low costs for the entire bus), and which in addition will accommodate relatively high currents.

SUMMARY OF THE INVENTION

According to an aspect of the present invention, a preferred embodiment of the invention is constructed in the manner of a multi-master system in which (1) each bus node and the central unit is a master; (2) the central unit provides the bus timing and controls the synchronization of the serial data bus; and (3) each bit transmission is divided up into a positive phase and a negative phase, the current supply of the bus nodes is effected in the positive phase and the data transmission is effected in the negative phase.

Another preferred embodiment of the serial data bus according to the invention is characterized in that the bus nodes and the central unit comprise means for switching between current supply and data transmission, and in that these means are preferably constituted by diodes.

Another preferred embodiment of the serial data bus according to the invention is characterized in that the data messages feature an event-driven, prioritized protocol.

The multi-master concept together with the event-driven prioritized protocol permits short reaction-times despite a low bit rate, that is to say despite low costs. The division of the bit transmissions into a positive and a negative phase, the current supply of the bus nodes being effected in the one phase and the data transmission being effected in the other, enables the transport of relatively high currents on the bus.

The invention further relates to use of the aforementioned serial data bus for a hazard-detection system consisting of a central unit and detectors connected to said central unit. This use is characterized in that each bus node comprises a micro-controller and an interface for the connection of a detector. Alternatively, the bus nodes are constituted by detectors with a micro-controller and integrated bus.

In yet another preferred embodiment, the use of the serial data bus according to the invention is characterized in that bus protocol and bus timing are coordinated with the micro-controllers in such a way that the latter can also take over the operation of the bus.

The serial data bus according to the invention is particularly well suited for hazard-detection systems, since on account of the low bit rate the bus can be very long and may comprise many bus nodes. In addition, the serial data bus according to the invention enables arbitrary topology and it is also very easy to install.

BRIEF DESCRIPTION OF THE DRAWINGS

FIG. 2 is a timing diagram of the various switching states of the serial data bus.

DETAILED DESCRIPTION OF THE INVENTION

Figure 1:
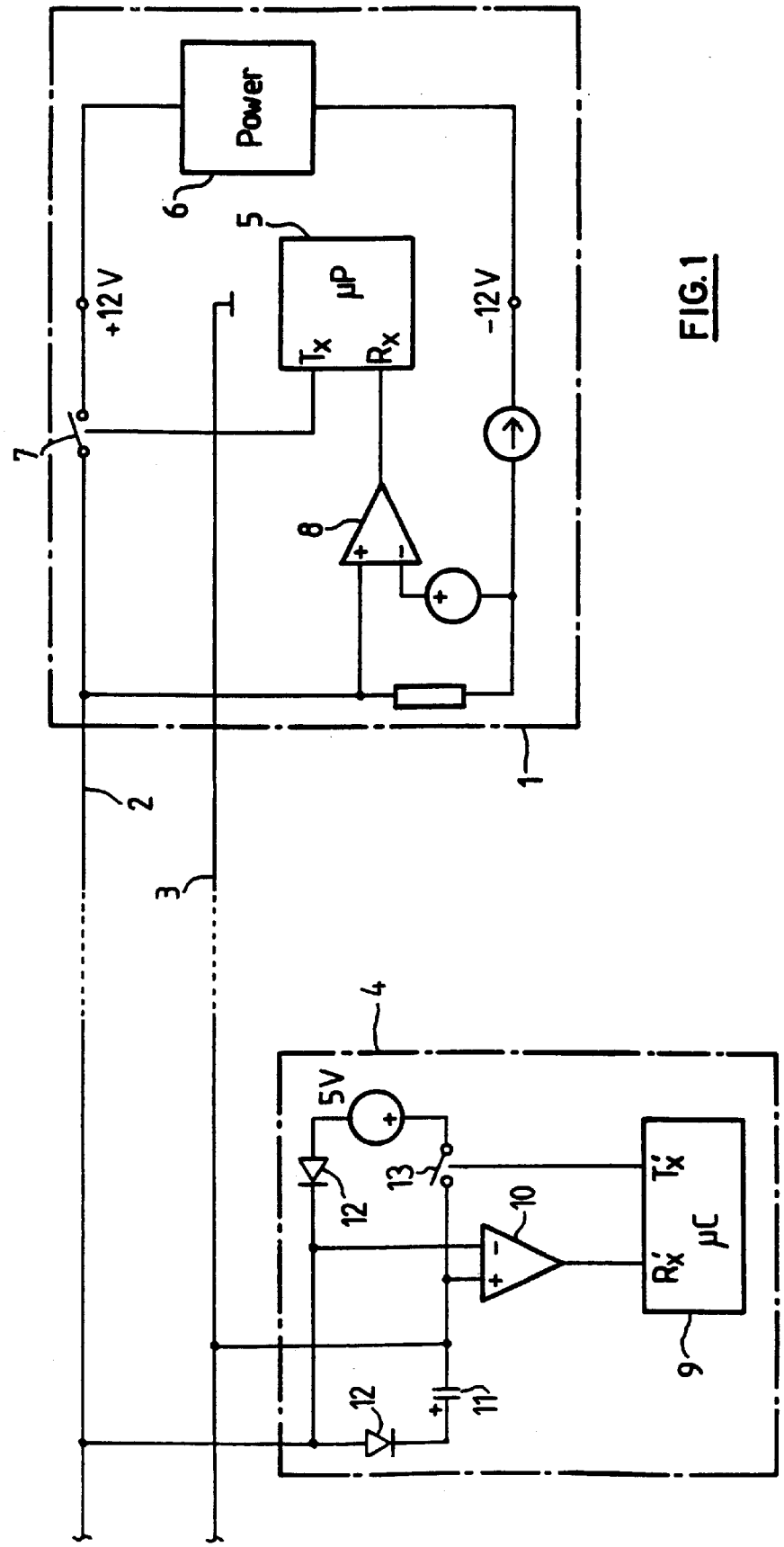
FIG. 1 is a block diagram of a serial data bus according to the invention with a plurality of bus nodes and central unit.

In FIG. 1 the basic structure of the serial data bus according to the invention is represented, consisting substantially of a two-wire line 2, 3 connected to a central unit 1 and of a plurality of bus nodes 4. The central unit 1 is preferably a hazard-detection control panel, that is to say the main operating station of an intrusion-detection or fire-detection system for acquiring alarm messages (in the case of an intrusion-detection system also sabotage messages) emanating from the detectors that are connected to the central unit and for controlling the programming of the connected devices for indication, alarm-raising and false alarm. The means for performing these functions, which are well-known, are symbolized in the central unit 1 by a microprocessor 5 which comprises, inter alia, an output $T_x$ and an input $R_x$ that are connected to the two-wire line 2, 3. The two-wire line 2, 3 is additionally connected to a current supply 6 which serves to supply the bus nodes 4 with electric current.

A bus node 4 may either comprise an interface to a connected detector or it may be constituted by a special detector with integrated bus. It is essential in both cases that the bus nodes 4 include a micro-controller 9. In the following description the expression 'nodes' also designates one detector.

The central unit 1 provides both the bit timing and the synchronization for the data messages on the bus. Such a data message is a bit sequence from a bus node 4 to the central unit 1 or conversely; it contains priority bits, control bits, address bits and, optionally, data bits. The transmission time of a bit designated below as a bit cell amounts to 6.144 ms, resulting in a bit rate of about 160 baud.

According to a preferred embodiment of the present invention, the central unit 1 divides the transmission of each bit of the data messages into positive phases P and negative phases I. A positive phase P occurs when the central unit 1 provides a positive voltage (nominally +12 V) to the two-wire line 2, 3. A negative phase I occurs when the central unit 1 provides a negative voltage (nominally −12 V) to the two-wire line 2, 3.

As shown in the preferred embodiment of FIG. 1, the polarity of the voltage provided to the two-wire line 2, 3 is controlled by microprocessor 5. Microprocessor 5 controls the two-wire line voltage via a control signal $T_x$ applied to switch 7. When switch 7 is closed, a positive voltage is applied to the two-wire line 2, 3. When switch 7 is open, a negative voltage is applied.

In the case of positive voltage on the two-wire line 2, 3, i.e., a positive phase P, current flows from the central unit 1 to the bus nodes 4. This current, which is rectified in the bus nodes 4, may equal to up to 1 A. Additionally, during this positive phase, data messages transmitted between the central unit 1 and the bus nodes 4 are effected in the form of voltage pulses, whereby the individual bit values of the transmitted data messages are based on the duration of the voltage pulses transmitted between the central unit 1 and the bus nodes 4.

In the case of negative voltage on the two-wire line 2, 3, i.e., a negative phase I, the central unit 1 serves as a −20 mA current sink and data messages transmitted between the bus nodes 4 and the central unit 1 are effected in the form of current pulses. The individual bit values corresponding to the data messages transmitted from the bus nodes 4 to the central unit 1 are determined by the amplitude of the current pulses transmitted between the bus nodes 4 and said central unit 1.

FIG. 2 is a timing diagram showing the positive and negative phases of operation. FIG. 2, line "a" shows logical "1" (left half of line "a") and logical "0" (right half of line "a") bit values for bits corresponding to data messages transmitted from the central unit 1 to the bus nodes 4 (top line showing voltage levels between +12 V and −12 V), and for bits corresponding to data messages transmitted from the bus nodes 4 to the central unit 1 (bottom line showing current levels between 0 mA and −20 mA). FIG. 2, line "a" further shows a bit cell of 6.144 ms duration consisting of four pulses, each pulse having a duration T of 1.536 ms (=3 times 0.512 ms). Shown on the abscissa are the positive P and negative I phases, noting that the duration of a positive phase P is always greater than or equal to the duration of a negative phase I. The current supplied by central unit 1 to the bus nodes 4 in the form of current pulses is shown by the dots in FIG. 2, line "a," and by bit cells $BZ_a$ and $BZ_z$ in FIG. 2, lines "b" and "C."

Accordingly, as shown in FIG. 2, line "a," a central unit 1 transmitting a logical "1" to the bus nodes 4 is characterized by a voltage pulse duration of 3 times T. A logical "0" from the central unit 1 to the bus nodes 4 is characterized by a voltage pulse duration of 2 times T. Comparators 10 at each of the bus nodes 4 are used to determine the logic level of the bits corresponding to the data messages received from the central unit 1.

A bus node 4 transmitting a data message to the central unit 1 applies a current signal to the two-wire line 2, 3 during a negative phase. Said signal is measured by the central unit 1 and limited to 20 mA. A comparator 8 which is connected in series upstream of the input $R_x$, of the microprocessor 5 measures this current and determines from it the logic level "0" or "1"; a current of 20 mA results in the level "1" and a current below this value results in the level "0." During the negative phase, the information for the bus nodes is available via the applied bit, the duration of the negative phase depending on whether a current of 20 mA is flowing or not. If such a current is flowing, then the length of the negative phase is equal to T (line "a," left), if no current is flowing, then the length is equal to 2 times T (line a, right). The negative phase is then followed again by a positive charge phase.

The variable length of the negative phase, depending on whether a current of 20 mA is measured in the central unit 1 or not, permits the necessary "perception" of the bus nodes for a decision regarding priority between various data messages (arbitration). This means, in other words, that the current that a bus node draws is in fact only noticed by the central unit 1, and that the voltage response of the central unit 1 is seen by all bus nodes.

Each of the bus nodes 4, which are connected as T-pieces to the two-wire line 2, 3, enabling arbitrary topology of the bus, include a micro-controller 9 a comparator 10 for determining the logic level of the individual bits of the received data messages, a support capacitor 11, diodes 12 acting as switches, and a switch 13 that is controlled by the micro-controller 9. When the switch 13 is closed, the negative branch in the bus node 4 is short-circuited and said branch applies a bit level "1" to the two-wire line 2, 3. According to the representation present invention, the micro-controller 9 comprises an input $R_{x'}$ and an output $T_{x'}$.

As a result of the positive and negative phases, only diodes are necessary as switches in the bus nodes 4 and the requirements regarding the temporal resolution of the bus node processor (micro-controller 9) are slight. This not too stringent timing has the advantage that the timing requirements of the protocol can be managed in the background by the micro-controller 9. The synchronization of the data messages is effected with additionally inserted, purely positive phases. When the bus is fully operational, that is to say when the support capacitors 11 of the bus nodes 4 are charged, the bus nodes draw no current within the voltage range between −5 V and +5 V, and as a result, a charge-free transition of the bus voltage through this range is ensured.

The central unit 1 generates, in addition to the aforementioned data, two different synchronization conditions TSYNCH and LSYNCH, which are represented in lines "b" and "c" of FIG. 2. TSYNCH forces the start of the next message and LSYNCH forces the restart of a detector line. According to the representation, the signal TSYNCH is formed by one bit cell with the level "1" and the signal LSYNCH is formed by three bit cells with the level "1." In the installed state and with an event-free detector line, after an LSYNCH each bus node 4 generates a message which contains its address in the arbitration field, the part of the message that is used to determine the priority.

A bus node that sets a recessive bit in the arbitration field, that is to say a bit which can be suppressed, has lower priority and thereby loses arbitration when compared to a data message with a dominant bit. Under such a condition, the bus node with lower priority must withdraw from the serial data bus for the remainder of the data message. In a preferred embodiment of the present invention, a logical "1" on the serial data bus is dominant and a logical "0" is recessive, i.e., a logical "1" will always win an arbitration against a logical "0." After identification of the TSYNCH condition, all bus nodes that have not yet won report again until the last bus node has also won. Bus nodes that have won may report again only after a renewed LSYNCH condition, unless they have an event with higher priority to report.

Each bus node 4 contains a unique 32-bit number with which it reports after its installation. This number, which makes special address switches at the bus nodes superfluous, is stored in a ROM of the bus node and is used after the bus node is first switched on or after a reset. The central unit 1 can address a bus node with the stated 32-bit number and communicate to it in the same message a short address, 8 bits in length, which it allocates. The bus node which is addressed in this way reports in the future with this short address, making possible a very much more compact protocol on the bus.

Likewise, after its installation each bus node emits its type identification signal, so that the central unit is informed about the capabilities of this bus node and about the format and the meaning of its data in the messages. Data may be exchanged only after allocation of the short address. Also after allocation of the short address, the bus node can be addressed at any time with the 32-bit address. In the case of a bus node reset caused by an error, the 32-bit address even has to be used in order to be able to address the bus node. This mechanism can also be used for the purpose of increasing the security of hazard-detection systems by periodic alteration of the short addresses.

Figure 3:
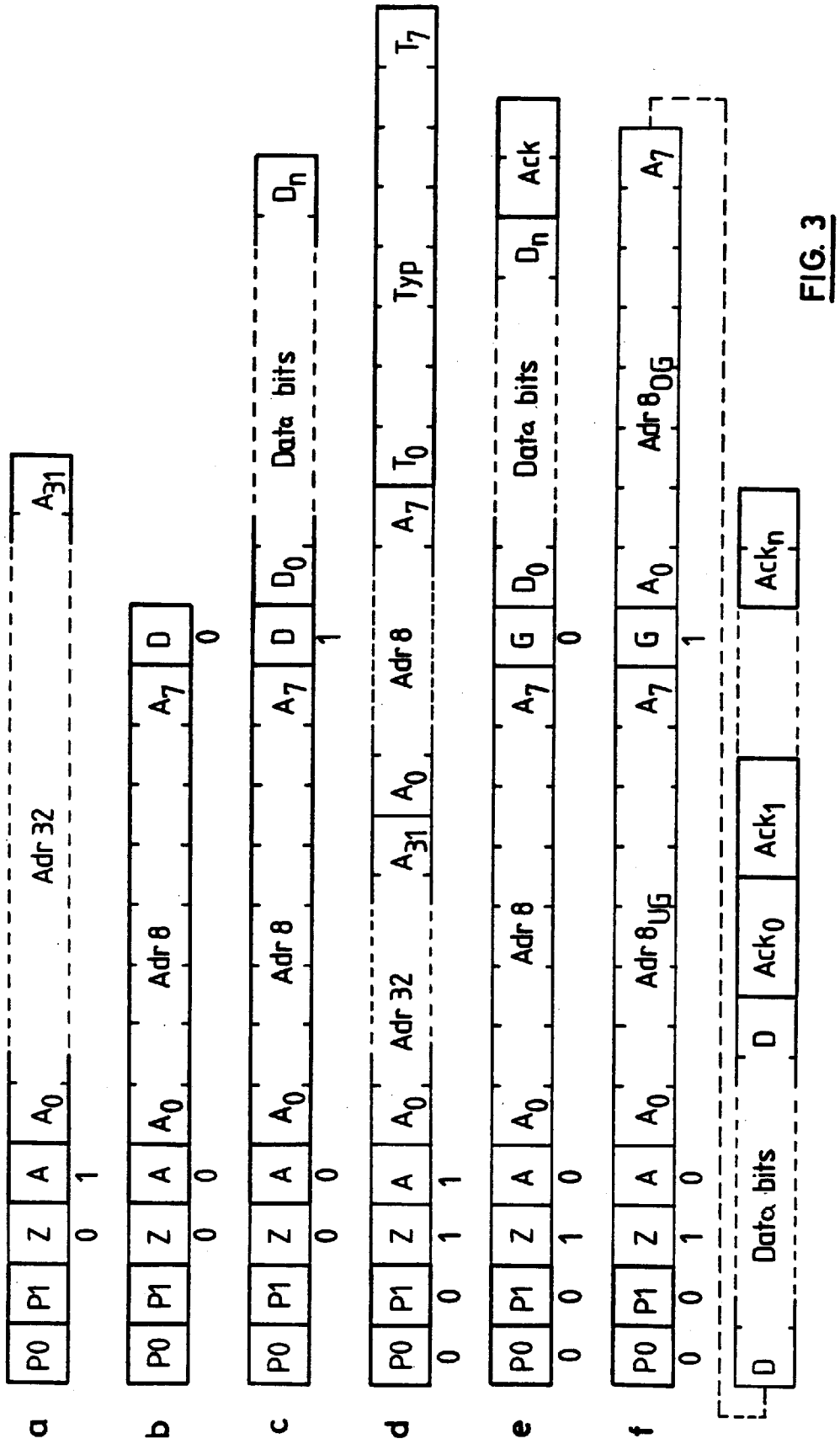
FIG. 3 is a representation of the data message format.

FIG. 3 shows the data format of the messages on the basis of typical bus states. In the FIG. 3, bits determined by the central unit are marked with a thin edge and bits determined by the bus node are marked with a thick edge. The individual lines of FIG. 3 show the following messages:

Line "a": a message in which a bus node reports after a reset with its individual address, 32 bits in length.

Line "b": a message for transmission of the presence of a bus node (without data).

Line "c": a message with data transmission from a bus node to the central unit.

Line "d": a message in which the long 32-bit address of a bus node is replaced by a short 8-bit address and in which the bus node type is requested.

Line "e": a message with data transmission from the central unit to a bus node.

Line "f": data transmission from the central unit to a group of bus nodes, the 8-bit addresses of which lie between specified lower and upper limits.

The data format will now be described below: the first two bits P0 and P1 are the priority bits which encode four priority levels. In the case of an event-free bus, when the bus nodes report only their presence, the priority bits are both zero. The next bit Z is the central-unit or direction-indicating bit of the bus. If the central unit wishes to send a message to a bus node, then it sets this bit to one, bus node messages leave the Z bit at zero. The following bit A is the address mode bit; A equal to one means that a 32-bit address follows, and A equal to zero means that an 8-bit address follows.

These four bits P0, P1, Z and A constitute, together with the following address bits, the arbitration field, the priority being determined by the sequence of these bits. A message with higher priority is always dominant in relation to competing data messages. With the aid of the priority bits P0 and P1 a message can always be sent out after the next TSYNCH if P0 and/or P1 is set equal to "1". A message from the central unit with Z=1 overwrites all messages with the priority P0=0, P1=0, and a 32-bit address with A=1 is dominant in relation to an 8-bit address. After the address-mode bit A the address value itself is then decisive. As has already been mentioned, data bits (designated as D0–Dn) can only be coupled to a message with an 8-bit address.

With respect to the communication of data bits D0–Dn, data messages from a bus node to the central unit containing data bits D0–Dn have after the address field a data existence bit D which specifies whether data follows. D=0 means that no data follows, and D=1 indicates that data (number and significance according to bus node type) follows. Since messages from the central unit to one or more bus nodes always have data, as otherwise they would be senseless, these messages do not require a data-existence bit. Here the address field is followed by a group bit G which enables the common addressing of a group of bus nodes, the addresses of which lie within lower and upper limits specified in the message. G=0 means that no group is addressed and that the data bits D0–Dn follow. G=1 means that a group is addressed, the preceding address signifying the lower group limit, and that another address follows for the upper group limit and, only after the latter, the data.

In the case of data messages from the central unit to the bus nodes, acknowledgment signals are provided after the data bits D0–Dn for the confirmation of message reception. A representative acknowledgment signal consists of two bits, one of which is always dominant (equal to "1") as to be visible on the bus. In addition, the acknowledgment signal encodes the parity of the preceding message bits. An acknowledgment signal "10" means that the data message has an odd number of ones, and an acknowledgment signal "01" means that the data message has an even number of ones. An acknowledgment signal "11" designates a second identical message within the time window for reception.

In the case of a group-wise data transfer the bus nodes emit their acknowledgment signal to the bus in succession, whereby the position of the acknowledgment signal specifies the spacing of the particular bus node address from the lower group limit. In the case of the message of FIG. 3, line "f," the lower group limit is designated by $Adr8_{UG}$ and the upper group limit by $Adr8_{OG}$. Correspondingly, n+1 acknowledgment signals $Ack_0$ to $Ack_n$ are emitted to the bus in succession from the bus nodes, whereby the signal $Ack_n$ originates from the bus node at the upper group limit; in this connection the following applies: $Ack_n = Adr8_{CG} - Adr8_{UG}$. If a group has gaps in its addresses, then a missing acknowledgment signal signifies a missing bus node address in the series.

Messages emitted from the bus nodes are repeated identically after about 1 second. In addition, the central unit can interrogate the state of a bus node at any time. The central unit likewise has to repeat its messages within a defined time interval, preferably within 255 bit-times, in order that it is accepted by the bus nodes. The bus nodes emit the parity-encoded acknowledgment signal "01" or "10" back to the first message and, to the second message, in case it is identical with the first, the acknowledgment signal "11" for the confirmation of acceptance.

The bus described above is distinguished by the following features and properties:

low costs two-wire line transport of high currents (0.5 A mean value per two-wire line)

bidirectional data communication arbitrary topology possibility of 255 bus nodes per line bus length greater than 1 km simple installation rapid reaction to messages of high priority

I claim:

1. A serial data bus for communicating data messages having a plurality of bits, said serial data bus comprising:

(a) a plurality of bus nodes, each of said bus nodes for functioning as a master;

(b) a central unit connected to said bus nodes for determining positive and negative phases of operation for said serial data bus, providing timing for said serial data bus, controlling the synchronization of said serial data bus, supplying current to said bus nodes during said positive phase, and for functioning as a master; and (c) a two-wire line connecting said bus nodes with said central unit over which said data messages are communicated to and from said central unit and said bus nodes in a prioritized manner regardless of whether a previous data message is presently being communicated, and wherein each bit of said data messages is transmitted during said negative phase over said two-wire line.

2. The serial data bus according to claim 1, wherein said bus nodes and said central unit include switching means for switching over between said current supply and said data transmission, said switching means preferably consists of diodes.

3. The serial data bus according to claim 1, wherein said data messages include an event-driven, prioritized protocol.

4. The serial data bus according to claim 1, wherein said bus nodes are connected to said bus as T-pieces.

5. The serial data bus according to claim 1, wherein said data messages are effected in the form of voltage pulses when transmitted between said central unit and said bus nodes during said positive phase, and effected in the form of current pulses when transmitted between said bus nodes and said central unit during said negative phase, said data messages including said plurality of bits the level values thereof being determined by the duration of said voltage pulses when transmitted between said central unit and said bus nodes during said positive phase, and by the amplitude of said current pulses when transmitted between said bus nodes and said central unit during said negative phase.

6. The serial data bus according to claim 1, wherein said central unit and said bus nodes each include a comparator for determining the logic level of said plurality of bits contained within each of said data messages received by said central unit and said bus nodes.

7. The serial data bus according to claim 1, wherein said data messages include priority bits, control bits, address bits and optionally data bits.

8. The serial data bus according to claim 1, wherein said data messages include an arbitration field for determining a priority of said data messages, said arbitration field comprising:

(a) two priority bits;

(b) a central-unit bit for indication of a direction of each of said data messages, said direction being either from said central unit to said bus nodes, or from said bus nodes to said central unit;

(c) an address-mode bit, such that said address-mode bit, said central-unit bit and said priority bits comprise the first four bits of each of said data messages; and (d) said address bits.

9. The serial data bus according to claim 8, wherein said arbitration field consists of arbitration field bits having arbitration bit values equal to logical "1's" or "0's," such that arbitration field bit values equal to "1" are dominant arbitration field bit values, said priority of data messages depending on the position of said dominant arbitration field bit values within said arbitration field.

10. The serial data bus according to claim 1, wherein said central unit is a main operating station of an intrusion-detection system for acquiring alarm and sabotage messages emanating from said bus nodes connected to said central unit, and for controlling the programming of said bus nodes for indication, alarm-raising and false alarms.

11. The serial data bus according to claim 1, wherein said central unit is a main operating station of a fire-detection system for acquiring alarm messages emanating from said bus nodes connected to said central unit, and for controlling the programming of said bus nodes for indication, alarm-raising and false alarms.

12. A hazard-detection method comprising:

prioritizing data messages on a serial data bus;

operating each of a plurality of bus nodes as a master;

operating a central unit as said master;

determining positive and negative phases of operation for said serial data bus;

providing timing for said serial data bus;

controlling the synchronization of said serial data bus;

supplying current to said bus nodes during said positive phase; and transmitting said data messages during said negative phase between said central unit and said bus nodes in a prioritized manner regardless of whether a previous data message is presently being communicated.

13. The hazard-detection method of claim 12, wherein said step of operating said bus nodes includes operating detectors, one at each of said nodes, each of said detectors including a micro-controller and an interface for the connection of said detectors.

14. The hazard-detection method of claim 12, wherein said step of operating said bus nodes includes operating detectors, one at each of said nodes, each of said detectors including a micro-controller having an integrated bus.

15. The hazard detection method of claim 12, wherein said step of operating said detectors includes implementing a protocol and synchronizing the timing for said serial data bus such that each micro-controller can take over the operation of said serial data bus.

* * * * *